US006462116B2

(12) United States Patent
Beekman et al.

(10) Patent No.: US 6,462,116 B2
(45) Date of Patent: Oct. 8, 2002

(54) COMBINATION OF AN ORGANOTHIO COMPOUND AND A ZINC MERCAPTO ESTER AS A HEAT STABILIZER IN PVC PROCESSING

(75) Inventors: George F. Beekman, West Chester; Lionel R. Price; Keith A. Mesch, both of Cincinnati, all of OH (US)

(73) Assignee: Morton International, Inc., Philadelphia, PA (US)

( * ) Notice: Subject to any disclaimer, the term of this patent is extended or adjusted under 35 U.S.C. 154(b) by 0 days.

(21) Appl. No.: 09/870,080

(22) Filed: May 30, 2001

(65) Prior Publication Data

US 2001/0036987 A1 Nov. 1, 2001

Related U.S. Application Data

(63) Continuation-in-part of application No. 09/153,909, filed on Sep. 16, 1998, now abandoned.

(51) Int. Cl.$^7$ .............................. C08K 5/36; C08K 5/37
(52) U.S. Cl. .................. 524/301; 524/368; 524/381; 524/392
(58) Field of Search ................. 524/301, 392, 524/181, 182, 368, 381

(56) References Cited

U.S. PATENT DOCUMENTS

| | | | | | |
|---|---|---|---|---|---|
| 2,954,362 | A | * | 9/1960 | Wilson | 524/180 |
| 3,067,166 | A | * | 12/1962 | Zaremsky | 524/178 |
| 3,167,527 | A | * | 1/1965 | Hechenbleikner et al. | 524/182 |
| 3,196,129 | A | * | 7/1965 | Hechenbleikner et al. | 524/182 |
| 3,297,629 | A | * | 1/1967 | Kauder | 524/181 |
| 3,417,039 | A | * | 12/1968 | Penneck | 524/392 |
| 3,507,827 | A | * | 4/1970 | Pollock | 524/302 |
| 3,544,510 | A | * | 12/1970 | Stapfer | 524/182 |
| 3,647,748 | A | * | 3/1972 | Brook et al. | 524/181 |
| 4,111,873 | A | * | 9/1978 | Cordes | 524/392 |
| 4,172,207 | A | * | 10/1979 | Mack | 560/147 |
| 4,279,806 | A | * | 7/1981 | Muldrow | 524/178 |
| 4,336,168 | A | * | 6/1982 | Hoch et al. | 524/300 |
| 4,360,619 | A | * | 11/1982 | Kugele et al. | 524/302 |
| 4,391,757 | A | * | 7/1983 | Kugele et al. | 524/302 |
| 4,515,916 | A | * | 5/1985 | Molt | 524/301 |
| 4,617,334 | A | * | 10/1986 | Kugele et al. | 524/182 |
| 4,686,255 | A | * | 8/1987 | Erwied et al. | 524/303 |
| 4,755,549 | A | * | 7/1988 | Kemper et al. | 524/301 |
| 4,810,736 | A | * | 3/1989 | Hyde | 524/181 |
| 4,963,594 | A | * | 10/1990 | Gay | 524/181 |
| 5,166,241 | A | * | 11/1992 | Kornbaum | 524/178 |
| 5,278,218 | A | * | 1/1994 | Carette et al. | 524/303 |
| 5,332,772 | A | * | 7/1994 | Beekman et al. | 524/301 |
| 5,536,767 | A | * | 7/1996 | Beekman et al. | 524/301 |

FOREIGN PATENT DOCUMENTS

| | | | | |
|---|---|---|---|---|
| CA | 1257439 | 7/1989 | ........... | C08L/27/06 |
| EP | 0133130 | 2/1985 | ........... | C08K/5/37 |
| EP | 0070092 | 1/1993 | ........... | C08K/5/00 |
| GB | 936770 | 6/1963 | | |

* cited by examiner

Primary Examiner—Peter Szekely

(57) ABSTRACT

The zinc bum experienced during the processing of a composition comprising a halogen-containing polymer and a zinc mercaptoester is eliminated by the addition of an organothio compound selected from dithioglycol, polyformals and polyacetals of said dithioglycol, and a mercaptoalkanol.

10 Claims, No Drawings

COMBINATION OF AN ORGANOTHIO COMPOUND AND A ZINC MERCAPTO ESTER AS A HEAT STABILIZER IN PVC PROCESSING

This application is a Continuation-In-Part of U.S. patent application Ser. No. 09/153,909, filed Sep. 16, 1998, now abandoned.

BACKGROUND OF THE INVENTION

Halogen containing polymers, especially those containing chlorine, are used widely and have great commercial significance. Polyvinyl chloride (PVC), in particular, is used in packaging, siding, pipe, and many extruded shapes. Such large scale and diverse use of the halogen-containing polymers depends upon the incorporation therein of good heat and light stabilizers. PVC, for example, is known to have a tendency to degrade upon prolonged exposure to heat and light during processing and use. Darkening or other color change and the loss of tensile, flexural, and impact strengths are the results of such degradation. Unless good low-cost stabilizers are available for addition to the polymer composition, the service life of articles made from the composition is limited, and its use severely restricted, as will be the conditions for making it.

One particularly troublesome form of degradation occurs when the polymer composition is processed into articles by methods employing heat to melt or soften the polymer. A color change can occur during the first few minutes at high temperatures (e.g., from about 175 to about 200° C.) and it is commonly referred to as early color or early discoloration. The avoidance of such early color is notably important in the manufacture of plastic pipe and siding. It is, of course, also important to prevent or reduce discoloration and deterioration of the polymer during extended exposure to high temperatures, which can lead to sudden and catastrophic degradation into a pitch-like abrasive material and cause the formation of corrosive materials such as HCl inside the fabricating equipment. The inner, highly polished surfaces of the equipment can thus be rendered essentially useless. A particularly troublesome instance of such sudden degradation often occurs when zinc compounds are employed as stabilizers; the phenomenon is known as "zinc burn" in the PVC industry.

An example of zinc burn is illustrated in U.S. Pat. No. 4,515,916, wherein a PVC composition containing zinc bis-(octyl thioglycolate) and a substituted dihydropyridine as a co-stabilizer showed such burn after 3 minutes on a two roll mill at 193° C.

In U.S. Pat. No. 3,417,039, Penneck teaches a stabilizing composition for chlorine-containing polymers which comprises a zinc salt of a carboxylic acid which may have sulfur substituents, a polyhydric alcohol, and an organic sulfur-bearing compound having the formula $R_1$-$S_{(1-2)}$-$R_2$, which is exemplified by bis-(n-dodecyloxyethyl) sulfide. The suitable salt-forming acids include benzoic, salicylic, phthalic, and maleic acid. Zinc 2-ethylhexyl maleate is a preferred salt. As shown hereinbelow, Penneck's stabilizing composition does not overcome the zinc burn problem.

In U.S. Pat. No. 4,963,594, noting that although innumberable sulfur compounds are said to be useful as heat stabilizers for PVC it is very difficult to select those which do in fact exert a heat stabilizing influence, Gay teaches a combination of a thiomalic ester such as 2-ethylhexyl thiomalate, an organozinc derivated such as the zinc mercaptide of isooctyl 2-mercaptoacetate, and an organic derivative of a metal from Group IIa of the Periodic Table such as calcium stearate.

British Patent No. 936,770 teaches that a PVC stabilizer comprising a synergistic combination of a terpene such as βpinene, a thio compound such as thioglycerol or an alkyl mercaptopropionate, and a zinc mercaptoester provides an extraordinarily high degree of stabilization. It teaches that such compositions are uniquely suitable for commercially advantageous high speed, high temperature forming operations such as melt extrusion.

Now, we have discovered that certain organothio compounds are superior co-stabilizers in combination with the zinc bis(mercaptoacid esters) when present during high temperature processing of halogen-containing polymers such as PVC.

SUMMARY OF THE INVENTION

It is an object of this invention to provide an improved heat stabilizer for halogen-containing polymer compositions.

It is an object of this invention to provide a halogen-containing polymer composition having improved heat stability.

It is a related object of this invention to eliminate zinc bum during the processing of pvc compositions at elevated temperatures.

These and other objects which will become apparent from the following description are achieved by a composition consisting essentially of a halogen-containing polymer and a stabilizer composition comprising:

(A) an organothio compound selected from the group consisting of a dithiodiglycol, and polyformals and polyacetals of said dithiodiglycol; and a mercaptoalkanol having the formula

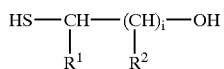

wherein $R^1$ and $R^2$ are the same or different and are hydrogen or $C_1$ to $C_{18}$ alkyl; and i is 0 or an integer from 1 to 6 inclusive;

at least one zinc mercaptoester selected from the group consisting of ($B^1$) a zinc mercaptoacid ester having the formula:

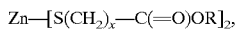

wherein R is a hydrocarbyl radical having from 2 to about 22 carbon atoms and x is 1 or 2;

($B^2$) a zinc mercaptoacid ester having the formula:

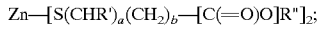

wherein

R' is methyl or C(=O)OR";

R" is [(CH$_2$—[C—(R*)(R$^{2*}$)]$_y$CH$_2$O)$_z$R$^{3*}$];

R* is H, alkyl, or hydroxyalkyl;

$R^{2*}$ is OH, hydroxy-substituted alkyl, or O(O=)C—$R^{4*}$;

$R^{3*}$ is H, (O=)C—$R^{4*}$, or alkyl, $R^{4*}$ is alkyl or alkenyl;

a=0 or 1; b=1 or 2; y=0 or 1; and z=1 to 4; with the proviso that when z is greater than 1, y=0; and ($B^3$) a zinc mercaptoalkyl carboxylic acid ester having the formula:

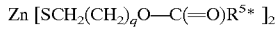

wherein $R^{5*}$ is an alkyl or alkenyl group having from 1 to 18 carbon atoms or an aryl group having from 6 to 12 carbon atoms, and q is from 1 to 6;

(C) from 0 to 40 phr of a basic alkali or alkaline earth metal compound; and (D) from 0 to 40 phr of a substituted dihydropyridine

DETAILED DESCRIPTION OF THE INVENTION

Examples of the mercaptoalkanols include without limitation mercaptoethanol, mercaptopropanol, mercapto isopropanol, and mercapto iso-undecanol.

Dithiodiglycol and polyformals and polyacetals thereof having the formula:

H—(OCH2CH2SSCH2CH2OCR2)$_n$—OH wherein R is hydrogen or methyl and n is 3–12 are among the preferred organic sulfides for the purposes of this invention.

The zinc mercaptoesters of Formula B$^1$ are exemplified by zinc bis(2-ethylhexylthioglycolate), zinc bis(octylmercaptopropionate), zinc bis(octadecylthioglycolate), zinc bis(octadecylmercaptopropionate), and zinc bis(ethylthioglycolate). They are easily prepared by the reaction of the corresponding mercaptoacid ester with zinc chloride in the presence of a suitable hydrogen chloride scavenger such as ammonia, ammonium hydroxide, and an alkali metal hydroxide or a carbonate thereof. Another method is the condensation of the mercaptoacid ester with zinc oxide in an organic medium such as a high boiling naphtha, xylene, paraffin wax and the like. Any ratio of the zinc compound and the mercaptoester will suffice so long as the reaction conditions are such as to drive the condensation but it is preferred to use a stoichiometric ratio of the reactants. Atmospheric pressure is suitable but the reaction will proceed satisfactorily at from about 50 to about 80° C. under reduced pressure. The maximum temperature is about 140–150° C.

The zinc bis-mercaptoacid ester may also be selected from among those disclosed in U.S. Pat. No. 5,536,767 including the zinc bis-thioglycolate, zinc bis-mercaptopropionate, and zinc mercaptosuccinate of a polyhydric alcohol or ether, carboxylate, or ether-carboxylate thereof having at least one functional hydroxy group as exemplified by ethylene glycol, glycerol, tetraethylene glycol, trimethylolethane, pentaerythritol, glycol ethers such as tetraethylene glycol monobutyl ether, and diethylene glycol monoethyl ether, glycol mono-carboxylates such as diethylene glycol monocaprate and ethylene glycol monocaprate, and glycerol carboxylates such as glycerol monocaprate, all of which are either available commercially or are made easily by conventional methods. The mercaptoacid esters may be made by conventional procedures wherein the mercaptoacid and the hydroxyl-group bearing compound are heated in the presence of a suitable catalyst such as methanesulfonic acid or p-toluenesulfonic acid and an azeotropic organic solvent such as toluene or heptane. Alternatively, the esterification may be conducted at reduced pressure The reaction is continued until the acid number is reduced to about 12–15.

The acids from which the esters are derived are also generally available commercially but may be made if so desired by procedures of long-standing in the chemical arts. Mercaptoacetic acid, for example, may be made by the reaction of sodium hydro-sulfide with sodium chloroacetate and subsequent acidification. β-mercaptopropionic acid is obtained in about 80% yield from the reaction of sodium hydrosulfide with β-propiolactone in acetonitrile and subsequent acidification. Mercaptosuccinic acid may be made by adding hydrogen sulfide across the double bond of maleic anhydride followed by hydrolysis. Also suitable for the purposes of this invention are the alkyl esters of α-mercaptopropionic acid, which may be prepared from α-chloropropionic acid and sodium thiosulfate according to the procedure described in U.S. Pat. No. 2,413,361.

The zinc mercaptoalkyl carboxylic acid esters of (B$^3$) are derived from the well known "reverse esters", so called because they are the products of the reaction of mercapto alcohols and carboxylic acids instead of mercaptocarboxylic acids and alcohols. The preparation of the esters and their use as stabilizers for vinyl chloride polymers are taught in U.S. Pat. No. 2,870,182. It is preferable that q is 1 or 2, and that R$^5$* is preferably an alkyl group having from 7 to 17 carbon atoms or a phenyl group. They are easily prepared by the reaction of the corresponding mercaptoalkyl ester with zinc chloride in the presence of a suitable hydrogen chloride scavenger such as ammonia, ammonium hydroxide, and an alkali metal hydroxide or a carbonate thereof. Another method is the condensation of the mercaptoalkyl ester with zinc oxide in an organic medium such as a high boiling naphtha, xylene, paraffin wax and the like. Any ratio of the zinc compound and the mercaptoalkyl ester will suffice so long as the reaction conditions are such as to drive the condensation but it is preferred to use a stoichiometric ratio of the reactants. Atmospheric pressure is suitable but the reaction will proceed satisfactorily at from about 50 to about 80° C. under reduced pressure. The maximum temperature is about 140–150° C.

The halogen containing polymers which are stabilized by the stabilizer compositions of this invention and which are useful in the polymer compositions of this invention include, for example, halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. As vinyl halide homopolymers, vinyl halide copolymers and polymer blends containing vinyl halide homopolymers or vinyl halide copolymers usable in the practice of this invention there, for example, may be used (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate methyl acrylate, 2-ethylhexyl acrylate, butyl acryalate, ethyl acrylate, and other alkyl acrylates, methyl methacrylate, ethyl methacrylate, butyl methacrylate, hydroxyethyl methacrylate and other alky methacrylates, methyl alpha chloracrylate, styrene, vinyl ethers such as vinyl ethyl ether, vinyl chloroethyl ether, vinyl phenyl ether, vinyl ketones such as vinyl methyl ketone, vinyl phenyl ketone, 1 fluoro-1-chlorothelene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylemethacrylate, polyvinyl chloride and polystyrene, polyvinyl chloride and acrylonitrile-butadiene-styrene copolymer, and polyvinyl chloride and polyetheylene and polymethy methacrylate. Typical vinyl halide copolymers usable in this invention include vinyl chloride-vinyl acetate (87:13), vinyl chloride-vinylidene chloride (95:5), vinyl chloride-trichloroethylene (95:5) and vinyl chloride-2-ethylhexyl acrylate (80:20). The polymer blends usable in the practice of this invention comprise physical blends of at least two distinct polymeric species and contain from 25 to 95 weight percent of vinyl halide homopolymer.

The term basic alkali or alkaline earth metal compound, as used herein, means compounds selected from the group consisting of oxides, hydroxides, sulfides, silicates, phosphates, borates, and carbonates of alkali metals and alkaline earth metals. Preferably, the alkali metals are lithium, sodium, and potassium, and the alkaline earth metals are magnesium, calcium, strontium, and barium. Examples of basic alkali or alkaline earth metal compounds include but are not limited to calcium hydroxide, magnesium hydroxide, lithium hydroxide, sodium borate, and sodium silicate.

Lubricants are optionally present in the stabilizer composition of this invention because of their important effect of reducing the temperature of the polymer compositions during mastication and extrusion. When employed, the stabilizer composition contains up to 75%, preferably 60% by weight or more, of a lubricant such as paraffin wax, calcium stearate, ethylene bis-stearylamide, stearyl stearate, cetyl palmitate, and other ester waxes may be used. From 0 to 15% of a partially oxidized polyethylene such as Allied Chemical's AC629A product may be used as an additional lubricant in the stabilizer compositions of this invention.

It will be readily apparent to one of ordinary skill in the art, that the precise amount of stabilizer composition used will depend upon several factors, including, but not limited to, the particular halogen-containing organic polymer employed, the temperature to which the polymer will be subjected, and the possible presence of other stabilizing compounds. In general, the more severe the conditions to which the halogen-containing organic polymer is subjected, and the longer the term required for resisting degradation, the greater will be the amount of stabilizer composition required. In general, the effective amount of a preferred stabilizer, i.e., one containing a lubricant and a substituted dihydropyridine, may be as little as 2.0 parts or less per hundred parts by weight of the halogen-containing polymer. Without the lubricant and substituted dihydropyridine, the amount may be 0.6 phr or less. While there is no critical upper limit on the amount of stabilizer composition, amounts in excess of 3.5 phr of the preferred stabilizer (2 phr of stabilizer without lubricant or substituted dihydropyridine) based on the weight of the halogen-containing polymer, do not yield a commensurate increase in effectiveness. More preferably, the stabilizer compositions containing both lubricant and substituted dihydropyridine are employed in amounts ranging from 2.0 to 3.0 phr by weight of the halogen-containing polymer. The preferred amount of stabilizer without lubricant and substituted dihydropyridine is from 0.6 to 1.0 phr.

The amount of each component in the stabilizer compositions of this invention may vary over a wide range but they will generally comprise, by weight, from 5 to 85%, preferably from 20 to 50% by weight of a zinc mercaptoester of this invention, and from 20 to 60%, preferably from 20 to 40%, by weight of the organothio compound. The stabilizer may also contain from 0 to 40%, preferably 5 to 30% of a basic alkali or alkaline earth compound. Although it has been discovered that the stabilizer composition of this invention is superior to one in which the organothio compound is replaced by a substituted dihydropyridine, a stabilizer composition of this invention which comprises a combination of the organothio compound and the substituted dihydropyridine provides both exceptional early- and long term color hold. Thus, stabilizer compositions of this invention contain from 0 to about 40% of the substituted dihydropyridine of U.S. Pat. No. 4,515,916. When used, a preferable amount of said dihydropyridine is from 5 to 30% of the total weight of the stabilizer composition.

The organothio compounds and the zinc mercaptoesters are preferably employed in the polymer compositions of this invention in the least amount that is sufficient to impart the desired resistance to heat deterioration to the halogen-containing organic polymers. The halogen-containing organic polymer compositions of this invention comprise from 0.1 part to 1.2 parts, preferably from 0.2 to 0.4 part, of the organothio compound and from 0.2 part to 1.7 parts, preferably from 0.4 to about 0.8 part, of the zinc mercaptoester per hundred parts by weight of the polymer (phr). Preferably, the polymer compositions comprise from 0.1 to 0.8 phr of a basic alkali or alkaline earth compound and from 0.1 to 0.8 phr by weight of the substituted dihydropyridine.

In addition to the halogen-containing polymer and the stabilizer composition, the polymer composition of this invention may contain conventional additives such as fillers, pigments, plasticizers, dyes, antioxidants, and ultraviolet light stabilizers. Materials such as calcined clays, calcium carbonate, and talcs may be used as fillers. Suitable pigments include titanium dioxide, carbon black, and iron oxide. Phthalates, sebacates, adipates, phosphates, and fatty esters having between 16 and 150 carbon atoms are representative of well known plasticizers suitable for the compositions of this invention. Suitable antioxidants include tricresyl phosphite; 2,6-di-t-butyl-4-methyl phenol; 2,6-di-t-butyl-4-decyloxy phenol; and 2-t-butyl-4-octadecyloxy phenol.

The polymer composition of this invention may be prepared by methods well known in the art and by the use of conventional equipment. The stabilizer composition may be added to the halogen-containing polymer with continuous blending in a high intensity mixer such as a Henschel blender. The important consideration is that the stabilizer composition and the halogen-containing polymer be thoroughly blended.

The stabilized halogen-containing polymer compositions of this invention may be used to form articles of manufacture such as pipe. A variety of conventional molding techniques may be employed to form the stabilized compositions into any desired shape.

The following examples illustrate the invention.

EXAMPLES 1–3 and

Comparative Example 1

| A PVC pipe composition containing: | |
|---|---|
| INGREDIENT | AMOUNT |
| PVC resin (k = 67) | 100.0 parts |
| Calcium carbonate | 5.00 phr |
| Titanium dioxide | 1.0 " |
| Calcium stearate | 0.45 " |
| Paraffin wax | 1.2 " |
| Oxidized polyethylene | 0.15 " |
| Calcium hydroxide | 0.3 " |
| Zinc bis-(2-ethylhexylthioglycolate) | 0.4 " | was modified as shown in Table I and the resulting compositions were processed on a standard horizontal two-roll mill (roll speeds 30F/40R) at 390° F. with chips taken at one minute intervals to a maximum of 12 minutes. The color properties of the chips were measured using a Hunter Labs Colorimeter (L, a, b) and the total color change (ΔE) was selected as the measurement for comparison in Table II. The dynamic thermal stability (DTS) of the compositions was measured on a Brabender Plasti-Corder PL-2000 at 190° C./60 rpm with No.6 roller blades and an electric head. The DTS, shown in Table III, was recorded as the time in minutes before a sharp upturn in the torque curve during processing was observed.

TABLE I

| Example phr | Co-Stabilizer | Use Level. |
|---|---|---|
| 1 | Dithiodiglycol | 0.30 |
| 2 | 2-mercaptoethanol | 0.30 |
| 3 | Dithiodiglycol polyformal | 0.30 |
| Comp. Ex. 1 | 1,6-dimethyl-2,5-dicarboxyethyl-1,4-dihydropyridine | 0.30 |

TABLE II

PVC Color Hold (ΔE) During Processing by Two-Roll Mill @ 390° F.

| min/ex | 1 | 2 | 3 | 4 | 5 | 6 | 7 | 8 | 9 | 10 | 11 | 12 |
|---|---|---|---|---|---|---|---|---|---|---|---|---|
| 1 | 5.2 | 6.9 | 8.9 | 10.4 | 11.1 | 12.4 | 13.2 | 14.3 | 15.6 | 16.7 | 17.8 | 19.8 |
| 2 | 4.0 | 4.7 | 5.7 | 6.7 | 7.7 | 8.6 | 10.0 | 12.1 | 14.8 | 18.3 | 20.6 | 36.8 |
| 3 | 4.8 | 5.5 | 5.9 | 7.0 | 11.5 | 16.5 | 19.5 | 21.8 | 23.2 | 23.7 | 24.2 | 35.0 |
| CE 1 | 2.8 | 2.7 | 3.0 | 3.6 | 4.7 | 7.7 | 24.2 | 56.8 | — | — | — | — |

TABLE III

PVC Dynamic Thermal Stability by Brabender @ 190° C.

| Example | Minutes |
|---|---|
| 1 | 12.8 |
| 2 | 11.2 |
| 3 | 9.0 |
| CE 1 | 8.6 |

EXAMPLE 4 and

Comparative Example 2

A PVC pipe composition containing:

| INGREDIENT | AMOUNT |
|---|---|
| PVC resin (k = 65) | 100.0 parts |
| Calcium carbonate | 5.00 phr |
| Titanium dioxide | 1.0 " |
| Calcium stearate | 0.60 " |
| Paraffin wax | 1.2 " |
| Oxidized polyethylene | 0.15 " | was modified as shown in Table IV and the resulting compositions were processed on a standard horizontal two-roll mill (roll speeds 30F/40R) at 390° F. (199° C.) with chips taken at one minute intervals. The color properties of the chips were measured using a Hunter Labs Colorimeter (L, a, b) and the whiteness index (WI) was selected as the measurement for comparison in Table V. The DTS, measured as described above but at 190° C. and at 60 RPM, is shown in Table VI. The composition in Comparative Example 2 is similar to that of Example 13 in U.S. Pat. No. 3,417,039 (Penneck).

TABLE IV

| Example | Co-stabilizers | phr |
|---|---|---|
| 4 | Zinc bis-(2-ethylhexylthioglycolate) | 0.40 |
|   | Dithiodiglycol polyformal (n = 5) | 0.30 |
|   | Calcium hydroxide | 0.30 |

TABLE IV-continued

| Example | Co-stabilizers | phr |
|---|---|---|
| CE 2 | Zinc Bis-(2-ethylhexyl maleate) | 1.00 |
|   | Bis-(n-decyloxyethyl) sulfide (b.p. > 200° C.) | 0.50 |
|   | 2,2-dimethyl-1,3-propanediol | 2.00 |

TABLE V

PVC Color Hold (ΔE) During Processing by Two-Roll Mill @ 390° F. White Tile Standard

| min/ex | 1 | 2 | 3 | 4 | 5 | 6 | 7 | 8 | 9 | 10 | 11 | 12 |
|---|---|---|---|---|---|---|---|---|---|---|---|---|
| 4 | 11.4 | 17.0 | 20.9 | 21.0 | 22.0 | 23.0 | 23.8 | 23.9 | 24.5 | 25.1 | 25.3 | 25.8 |
| CE 2 | 2.6 | 3.6 | 11.3 | 44.7 | — | char | | | | | | |

TABLE VI

PVC Dynamic Thermal Stability by Brabender @ 190° C.

| Example | Fusion Time Minutes | Stability Time Minutes | Min. Torque g.m | Max. Torque g.m |
|---|---|---|---|---|
| 4 | 1.9 | 19.0 | 1275 | 2500 |
| CE 2 | 2.5 | 4.5 | 1900 | 2000 |

EXAMPLE 5 and

Comparative Examples 3 & 4

A PVC pipe composition containing:

| INGREDIENT | AMOUNT |
|---|---|
| PVC resin (k = 65) | 100.0 parts |
| Calcium carbonate | 5.00 phr |
| Titanium dioxide | 1.0 " |
| Calcium stearate | 0.60 " |

-continued

A PVC pipe composition containing:

| INGREDIENT | AMOUNT |
|---|---|
| Paraffin wax | 1.2 " |
| Oxidized polyethylene | 0.20 " | was modified as shown in Table VII and the resulting compositions were processed on a standard horizontal two-roll mill (roll speeds 30F/40R) at 390° F. (199° C.) with chips taken at one minute intervals. The color properties of the chips were measured using a Hunter Labs Colorimeter (L, a, b) and the total energy (ΔE) was selected as the measurement for comparison in Table VIII.

TABLE VII

| Example | Co-stabilizers | phr |
|---|---|---|
| 5 | Zinc bis-(2-ethylhexylthioglycolate) | 0.40 |
| | Dithiodiglycol | 0.30 |
| | Calcium hydroxide | 0.30 |
| CE 3 | Zinc Bis-(2-ethylhexyl maleate) | 0.50 |
| | 2,2-dimethyl-1,3-propanediol | 0.25 |
| | Dithiodiglycol | 0.30 |
| CE 4 | Zinc Bis-(2-ethylhexyl maleate) | 0.50 |
| | Dithiodiglycol | 0.30 |

TABLE VIII

PVC Color Hold (ΔE) During Processing by Two-Roll Mill @ 390° F. White Tile Standard

| min/ex | 1 | 2 | 3 | 4 | 5 | 6 | 7 | 8 | 9 | 10 | 11 | 12 |
|---|---|---|---|---|---|---|---|---|---|---|---|---|
| 5 | 6.3 | 10.9 | 14.6 | 15.7 | 16.9 | 17.8 | 19.0 | 19.6 | 21.0 | 21.7 | 23.0 | 23.9 |
| CE 3 | 4.8 | 6.4 | 8.7 | 9.2 | 9.9 | 11.7 | char | | | | | |
| CE 4 | 5.4 | 7.8 | 9.6 | 10.0 | 10.4 | 14.2 | char | | | | | |

TABLE IX

PVC Dynamic Thermal Stability by Brabender @ 190° C.

| Example | Min. Torque g.m | Max. Torque g.m |
|---|---|---|
| 5 | 1375 | 2425 |
| CE3 | 1600 | 1800 |
| CE4 | 1625 | 1825 |

EXAMPLES 6–8 and Comparative Example 5

A PVC pipe composition containing:

| INGREDIENT | AMOUNT |
|---|---|
| PVC resin (SHINTECH SE 950) | 100.0 parts |
| Calcium carbonate | 5.00 phr |
| Titanium dioxide | 1.0 " |
| Calcium stearate | 0.40 " |
| Paraffin wax | 1.2 " |

-continued

A PVC pipe composition containing:

| INGREDIENT | AMOUNT |
|---|---|
| Oxidized polyethylene | 0.15 " |
| Zinc 2-ethylhexyl thioglycolate | 0.20 | was modified as shown in Table X and the resulting compositions were processed on a standard horizontal two-roll mill (roll speeds 30F/40R) at 390° F. (199° C.) with chips taken at one minute intervals. The color properties of the chips were measured using a Hunter Labs Colorimeter (L, a, b) and the total energy (ΔE) was selected as the measurement for comparison in Table XI. The DTS, measured as described above but at 1 90° C. and at 60 RPM, is shown in Table XII. The composition in Comparative Example 5 is similar to that of Example 22 in U.S. Pat. No. 4,963,594 (Gay)

TABLE X

| Example | Co-stabilizers | phr |
|---|---|---|
| 6 | Dithiodiglycol | 0.80 |
| 7 | 2-mercaptoethanol | 0.80 |
| 8 | Dithiodiglycol polyformal | 0.80 |
| CE 5 | 2-ethylhexylthiomalate | 0.80 |

TABLE XI

PVC Color Hold (ΔE) During Processing by Two-Roll Mill @ 390° F. White Tile Standard

| min/ex | 1 | 2 | 3 | 4 | 5 | 6 | 7 | 8 |
|---|---|---|---|---|---|---|---|---|
| 6 | 14.5 | 23.0 | 27.5 | 28.3 | 29.2 | 28.5 | 28.2 | 33.3 |
| 7 | 12.5 | 19.0 | 23.5 | 26.7 | 28.1 | 27.4 | 25.4 | 34.2 |
| 8 | 13.1 | 18.4 | 21.5 | 24.6 | 26.6 | 26.8 | 38.8 | — |
| CE 5 | 9.7 | 10.2 | 10.9 | 12.8 | 16.5 | 42.9 | — | — |

TABLE XII

PVC Dynamic Thermal Stability by Brabender @ 190° C.

| Example | Min. Torque g.m | Max. Torque g.m |
|---|---|---|
| 6 | 1602 | 2962 |
| 7 | 1561 | 3017 |
| 8 | 1399 | 3122 |
| CE 5 | 1539 | 2691 |

EXAMPLES 9–11 and

Comparative Example 6

| A PVC pipe composition containing: | |
|---|---|
| INGREDIENT | AMOUNT |
| PVC resin (SHINTECH SE 950) | 100.0 parts |
| Calcium carbonate | 5.00 phr |
| Titanium dioxide | 1.0 " |
| Calcium stearate | 0.40 " |
| Paraffin wax | 1.2 " |
| Oxidized polyethylene | 0.15 " |
| Zinc 2-ethylhexyl thioglycolate | 0.20 |
| Calcium hydroxide | 0.40 | was modified as shown in Table XIII and the resulting compositions were processed on a standard horizontal two-roll mill (roll speeds 30F/40R) at 390° F. (1 99° C.) with chips taken at one minute intervals. The color properties of the chips were measured using a Hunter Labs Colorimeter (L, a, b) and the total energy (ΔE) was selected as the measurement for comparison in Table XIV. The DTS, measured as described above but at 190° C. and at 60 RPM, is shown in Table X0. Comparative Example 6 is like C.E. 5 except for the addition of calcium hydroxide.

TABLE XIII

| Example | Co-stabilizers | phr |
|---|---|---|
| 9 | Dithiodiglycol | 0.40 |
| 10 | 2-mercaptoethanol | 0.40 |
| 11 | Dithiodiglycol polyformal | 0.40 |
| CE 6 | 2-ethylhexylthiomalate | 0.40 |

TABLE XIV

PVC Color Hold (ΔE) During Processing by Two-Roll Mill @ 390° F. White Tile Standard

| min/ex | 1 | 2 | 3 | 4 | 5 | 6 | 7 | 8 | 9 | 10 | 11 | 12 |
|---|---|---|---|---|---|---|---|---|---|---|---|---|
| 9 | 17.8 | 26.6 | 29.9 | 32.7 | 32.7 | 32.6 | 31.5 | 30.8 | 31.0 | 31.4 | 31.6 | 36.0 |
| 10 | 11.6 | 12.8 | 14.7 | 14.3 | 15.8 | 16.3 | 17.0 | 19.3 | 22.7 | 24.7 | 26.6 | 29.4 |
| 11 | 20.1 | 26.8 | 32.0 | 32.7 | 34.7 | 34.6 | 34.5 | 33.9 | 33.1 | 32.4 | 32.4 | 32.7 |
| CE 6 | 12.5 | 15.9 | 34.5 | burn | — | — | — | — | — | — | — | — |

TABLE XV

PVC Dynamic Thermal Stability by Brabender @ 190° C.

| Example | Min. Torque g.m | Max. Torque g.m |
|---|---|---|
| 9 | 1861 | 2894 |
| 10 | 1854 | 2973 |
| 11 | 1835 | 2806 |
| CE 7 | 2135 | 2854 |

What is claimed is:

1. A polymer composition comprising a halogen-containing polymer and a stabilizer composition consisting essentially of:

(A) an organothio compound selected from the group consisting of dithiodiglycol, polyformals and polyacetals of said dithiodiglycol, and a mercaptoalkanol having the formula:

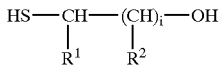

wherein $R^1$ and $R^2$ are the same or different and are hydrogen or $C_1$ to $C_{18}$ alkyl; and i is 0 or an integer from 1 to 6 inclusive;

(B) at least one zinc mercaptoester selected from the group consisting of:

($B^1$) a zinc mercaptoacid ester having the formula:

$$Zn-[S(CH_2)_x-C(=O)OR]_2$$

wherein R is a hydrocarbyl radical having from 2 to about 22 carbon atoms and x is 1 or 2;

($B^2$) a zinc mercaptoacid ester having the formula:

$$Zn-\{S(CHR)_a(CH_2)_b-[C(=O)OR']_2,$$

wherein:
   R' is methyl or C(=O)OR"
   R" is $[(CH_2-[C-(R^*(R^{2*})]_y {}^*CH_2O)_zR^3]$;
   $R^*$ is H, alkyl, or hydroxyalkyl;
   $R^{2*}$ is OH, hydroxy-substituted alkyl, or O(O=)C—$R^{4*}$;
   $R^{3*}$ is H, (O=)C—$R^{4*}$, or alkyl;
   $R^{4*}$ is alkyl or alkenyl;
   A=0 or 1; b=1 or 2, y=0 or 1; and z=1 to 4;

($B^3$) a zinc, mecaptoalk yl carboxylic acid ester having the formula:

$$Zn[SCH_2(CH_2)_qO-C(=O)R^{5*}]_2;$$

wherein
   $R^{5*}$ is an alkyl or alkenyl group having from 1 to 18 carbon atoms or an aryl group having from 6 to 12 carbon atoms, and q is from 1 to 6;
   the amount of said zinc mercaptoester being from 0.2 part to 1.7 parts per hundred parts of the polymer;

(C) from 0 to 40% by weight of a basic alkali or alkaline earth metal compound; and (D) from 0 to 40% by weight of a substituted dihydropyridine.

2. The composition of claim 1 wherein the zinc mercaptoester is the zinc mercaptoacid ester of $B^1$.

3. The composition of claim 1 wherein the zinc mercaptoester is the zinc mercaptoacid ester of $B^2$.

4. The composition of claim 1 wherein the zinc mercaptoester is the zinc mercaptoalkyl ester of $B^3$.

5. The composition of claim 1 wherein x is 1 and R has 8 carbon atoms.

6. The composition of claim 1 wherein z=2 and $R^{3*}$ is alkyl.

7. The composition of claim 6 wherein z=1, y=1, and $R^{2*}$ is OH.

8. The composition of claim 6 wherein z=1, $R^{3*}$ is (O=)C—$R^{4*}$, and $R^{4*}$ is alky.

9. The composition of claim 6 wherein z=1, y=1, $R^*$ is alkyl, and $R^{2*}$ is hydroxyalkyl.

10. The composition of claim 9 wherein the organothio compound is mercaptoethanol.

* * * * *